US006381632B1

(12) United States Patent
Lowell

(10) Patent No.: US 6,381,632 B1
(45) Date of Patent: *Apr. 30, 2002

(54) METHOD AND APPARATUS FOR TRACKING NETWORK USAGE

(75) Inventor: Bonnie J. Lowell, Brooklyn, NY (US)

(73) Assignee: YOUpowered, Inc., Grand Rapids, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/710,066

(22) Filed: Sep. 10, 1996

(51) Int. Cl.[7] ................. G06F 15/16; G06F 15/173; G06F 17/60
(52) U.S. Cl. ................. 709/203; 709/224; 705/14
(58) Field of Search ................. 705/14, 21; 709/203, 709/217, 224, 218, 219; 725/9, 13, 14, 16, 23

(56) References Cited

U.S. PATENT DOCUMENTS

| | | | | |
|---|---|---|---|---|
| 4,319,326 A | * | 3/1982 | Uchida | 705/21 |
| 5,235,414 A | * | 8/1993 | Cohen | 725/13 |
| 5,483,276 A | * | 1/1996 | Brooks et al. | 725/10 |
| 5,515,376 A | * | 5/1996 | Murthy et al. | 370/402 |
| 5,524,238 A | * | 6/1996 | Miller et al. | 707/4 |
| 5,642,485 A | * | 6/1997 | Deaton et al. | 705/14 |
| 5,654,905 A | * | 8/1997 | Mulholland et al. | 702/186 |
| 5,675,510 A | * | 10/1997 | Coffey et al. | 709/224 |
| 5,696,898 A | * | 12/1997 | Baker et al. | 713/201 |
| 5,708,780 A | | 1/1998 | Levergood et al. | |
| 5,710,884 A | * | 1/1998 | Dedrick | 709/217 |
| 5,712,979 A | * | 1/1998 | Graber et al. | 709/224 |
| 5,715,314 A | | 2/1998 | Payne et al. | |
| 5,724,424 A | | 3/1998 | Gifford | |
| 5,727,129 A | * | 3/1998 | Barrett et al. | 706/10 |

(List continued on next page.)

FOREIGN PATENT DOCUMENTS

JP    406150163    * 5/1994 ................. 705/21

OTHER PUBLICATIONS

RNS, Inc., "Smarter Solutions for Remote Access," http://www.rns.com/nethopper/solution.html, pp. 1–9, Aug. 29, 1996.*

Bell, T., et al., "Communications," IEEE Spectrum, vol. 33, No. 1, pp. 30–41, Jan. 1996.*

Mounji, A., et al., "Distributed Audit Trial Analysis," Proceedings of the Symposium on Network and Distributed System Security, IEEE, pp. 102–112, Feb. 1995.*

(List continued on next page.)

Primary Examiner—Zarni Maung
Assistant Examiner—Andrew Caldwell
(74) Attorney, Agent, or Firm—Greenberg Traurig; Adam B. Landa

(57) ABSTRACT

The present invention provides a method of recording an occurrence of a data transmission between a node and a network, comprising: inspecting the data transmission between the node and the network to locate a network address contained in the data transmission; inspecting the data transmission between the node and the network to determine an activity type to be achieved by the data transmission; and recording the activity type and the network address if the network address is one of a plurality of predetermined desired network addresses and the activity type is one of a plurality of predetermined desired activity types. The present invention also provides for creating an activity file by recording an occurrence of a data transmission between a node and a network, transmitting the activity file over the network to a processing site, evaluating the activity file to determine a reward based upon the activity file, and transmitting indicia of the reward to the node.

12 Claims, 3 Drawing Sheets

U.S. PATENT DOCUMENTS

| | | | | |
|---|---|---|---|---|
| 5,732,218 A | * | 3/1998 | Bland et al. | 709/224 |
| 5,752,159 A | * | 5/1998 | Faust et al. | 725/105 |
| 5,778,182 A | * | 7/1998 | Cathey et al. | 709/219 |
| 5,781,909 A | * | 7/1998 | Logan et al. | 707/200 |
| 5,794,210 A | * | 8/1998 | Goldhaber et al. | 705/14 |
| 5,819,156 A | * | 10/1998 | Belmont | 725/14 |
| 5,835,722 A | * | 11/1998 | Bradshaw et al. | 709/225 |
| 5,848,396 A | * | 12/1998 | Gerace | 705/10 |
| 5,857,190 A | * | 1/1999 | Brown | 707/10 |
| 5,867,651 A | * | 2/1999 | Dan et al. | 709/203 |
| 5,878,384 A | * | 3/1999 | Johnson et al. | 702/187 |
| 5,884,033 A | * | 3/1999 | Duvall et al. | 709/206 |
| 5,915,243 A | * | 6/1999 | Smolen | 705/14 |
| 5,918,014 A | * | 6/1999 | Robinson | 709/219 |
| 5,987,611 A | * | 11/1999 | Freund | 713/201 |
| 6,018,619 A | * | 1/2000 | Allard et al. | 709/224 |
| 6,108,637 A | * | 8/2000 | Blumenau | 705/7 |
| 6,122,657 A | * | 9/2000 | Hoffman, Jr. et al. | 709/201 |
| 6,122,740 A | * | 9/2000 | Andersen | 713/200 |
| 6,138,155 A | * | 10/2000 | Davis et al. | 709/224 |
| 6,148,336 A | * | 11/2000 | Thomas et al. | 709/224 |
| 6,189,030 B1 | * | 2/2001 | Kirsch et al. | 709/224 |

OTHER PUBLICATIONS

Mukherjee, B., et al., "Network Intrusion Detection," IEEE Network, vol. 8, No. 3, pp. 26–41, Jun. 1994.*

Chapman, D., "Network (In)Security Through IP Packet Filtering," Proceedings of the Third USENIX UNIX Security Symposium, USENIX Assoc., pp. 63–76, Sep. 1992.*

Schaen, S., et al., "Network Auditing: Issues and Recommendations," Proceedings, Seventh Annual Comp. Security Applications Conf., IEEE, pp. 66–79, Dec. 1991.*

Berners–Lee, T., et al., RFC 1945, Hypertext Transfer Protocol—HTTP/1.0, Network Working Group, pp. 1–60, May 1996.*

WebReporter Manual, http://webgroup.uu.net/webreporter, chapters 1–8, appendices A–B, Dec. 1995.*

* cited by examiner

METHOD AND APPARATUS FOR TRACKING NETWORK USAGE

BACKGROUND OF THE INVENTION

This invention relates to a method and apparatus for tracking usage of a network, and more specifically, to a method and apparatus for monitoring selected network activities. The invention also relates to a method and apparatus for rewarding users for performing particular activities on a network.

DESCRIPTION OF RELATED ART

Computer networks, defined generally as the highways for information, are used in almost every facet of home and office life. Because of this, network traffic generally is the subject of substantial examination. Many products have been developed that can monitor network traffic and the flow of traffic past a given point in a computer network. Many of the network monitoring programs that are available can also monitor traffic on the Internet. Generally, these programs detect traffic patterns instead of the senders and receivers.

Recently, a few programs have appeared that run on the computer accessing the network; these programs monitor the information transmitted and received. These programs have been developed out of a concern that children can gain access to "adult" material over the Internet or otherwise. One example of such programs is SurfWatch, which blocks certain Internet traffic from being accessed at a personal computer running the program. SurfWatch is directed to helping reduce the risk of children and others uncovering sexually explicit material on the Internet.

Another such program is called Net Nanny. Net Nanny is a software program that allows its operator to monitor and/or block access to data residing on or passing through a personal computer, including information arriving at the computer from a network such as the Internet. Net Nanny screens data arriving at or passing through a computer in real-time for matches with a pre-stored list, or dictionary. If a match is found, access to the information is either monitored or blocked.

Programs like SurfWatch and Net Nanny monitor access to a network looking for keywords. When the keywords are found, the result is to record or block associated and ostensibly offending information. A drawback of these programs is that they do not permit the activity of a user to be monitored and comprehensively or selectively recorded and selectively delivered to a central site. Another drawback of these programs is that they do not allow a user to preselect certain activities that should not be monitored. Yet another drawback of these programs is that they do not allow the network user to determine what activity to monitor or not to monitor.

Another type of monitoring program is called SiteTrack. SiteTrack works in connection with a World Wide Web server and tracks users as they move through a site on the World Wide Web. Such tracking is done using two different methodologies, one called "tokens," and the other called "cookies."

A SiteTrack cookie is an identifier stored on the user's computer. When a user accesses a SiteTrack'ed server, if the user's browser supports cookies, the server assigns a unique session ID, or "cookie" to the user. The session ID is stored on the user's computer and presented with all further requests to the server. The server can therefore identify users and monitor their activity as they move through the Web site.

Alternatively, where the user's browser does not support cookies, SiteTrack can insert "tokens," or alphanumeric strings, into the URLs embedded in hypertext markup language (HTML) pages that are sent to a user's browser. When a user links to another HTML page via the embedded URL, the embedded token can be recognized, and the user's activity can thus be monitored from the server. The token process has a drawback in that it can only monitor users when they are linking between pages on a single Web site. A further drawback is that once the user links to another Web site, the user is not "recognized" upon his or her return, but instead, is treated as another user. Even a further drawback is that the HTML must be modified in order to operate. Modification of the HTML leads to substantial processing at the server and visibly changed URL links as inspected at the user's computer.

Although the cookie method can monitor a user even if the user leaves the Web site and later returns, it has a significant drawback in that no information about what the user did during that time is available. Another drawback is that once the user closes the browser, the cookie becomes inactive, and will not be sent on subsequent visits.

All of the above-discussed monitoring programs are invasive of the privacy of the user because the user being monitored has no control over which of his or her activities are being monitored. Thus, a further drawback of all of these systems is that the user has no control over being monitored by this process.

None of the above-discussed programs provide a system that can monitor selected activity of a user using a network terminal, where the user can, in advance, select particular data to be monitored and other data not to be monitored. None of the above-discussed programs provide a system that permits the user to deliver selected portions of the monitored activity to a central repository, and/or make further use of the data resulting from the monitoring activity.

SUMMARY OF THE INVENTION

The preferred embodiments of the present invention overcome the problems with the systems and programs described above by providing a method and apparatus for tracking network usage and monitoring selected network activities. The invention also relates to a method and apparatus for rewarding users for particular types of use of a network.

The preferred embodiments of the present invention provide a method of recording an occurrence of a data transmission between a node and a network, comprising: inspecting the data transmission between the node and the network to locate a network address contained in the data transmission; inspecting the data transmission between the node and the network to determine an activity type to be achieved by the data transmission; and recording the activity type and the network address if the network address is one of a plurality of predetermined desired network addresses and the activity type is one of a plurality of predetermined desired activity types.

The preferred embodiments of the present invention also provide for creating an activity file by recording an occurrence of a data transmission between a node and a network, transmitting the activity file over the network to a processing site, evaluating the activity file to determine a reward based upon the activity file, and transmitting indicia of the reward to the node.

Other features and advantages of the present invention will become apparent from the following description of the preferred embodiments of the present invention which are shown in the accompanying drawings.

DETAILED DESCRIPTION OF PREFERRED EMBODIMENTS

The term "software" or "program" as used herein refers in the broadest sense to instructions to be carried out by a computer. Many times, "software" can be implemented in computing hardware. Thus, software and/or program refer to obtaining a result by carrying out a task whether implemented in a circuit or a ROM or in more traditional forms for software like a disk and/or RAM of a computer.

The term "connection" or "connect" as used herein also refers to the broadest sense of those words. By way of example, but not intending to limit the generality of the preceding sentence, a connection can include a direct wire connection, a conventional telephone connection, an ISDN telephone connection, a cellular telephone connection, a wireless radio connection, an infrared connection and a fiber-optic connection. The term connection is also used herein to include any type of communication protocol and/or data rates of the connection including known protocols and data rates such as using the peer-to-peer protocol (over TCP/IP) over a dial up line with a 28.8 modem. In addition, the connection may be analog or digital.

Figure 1:
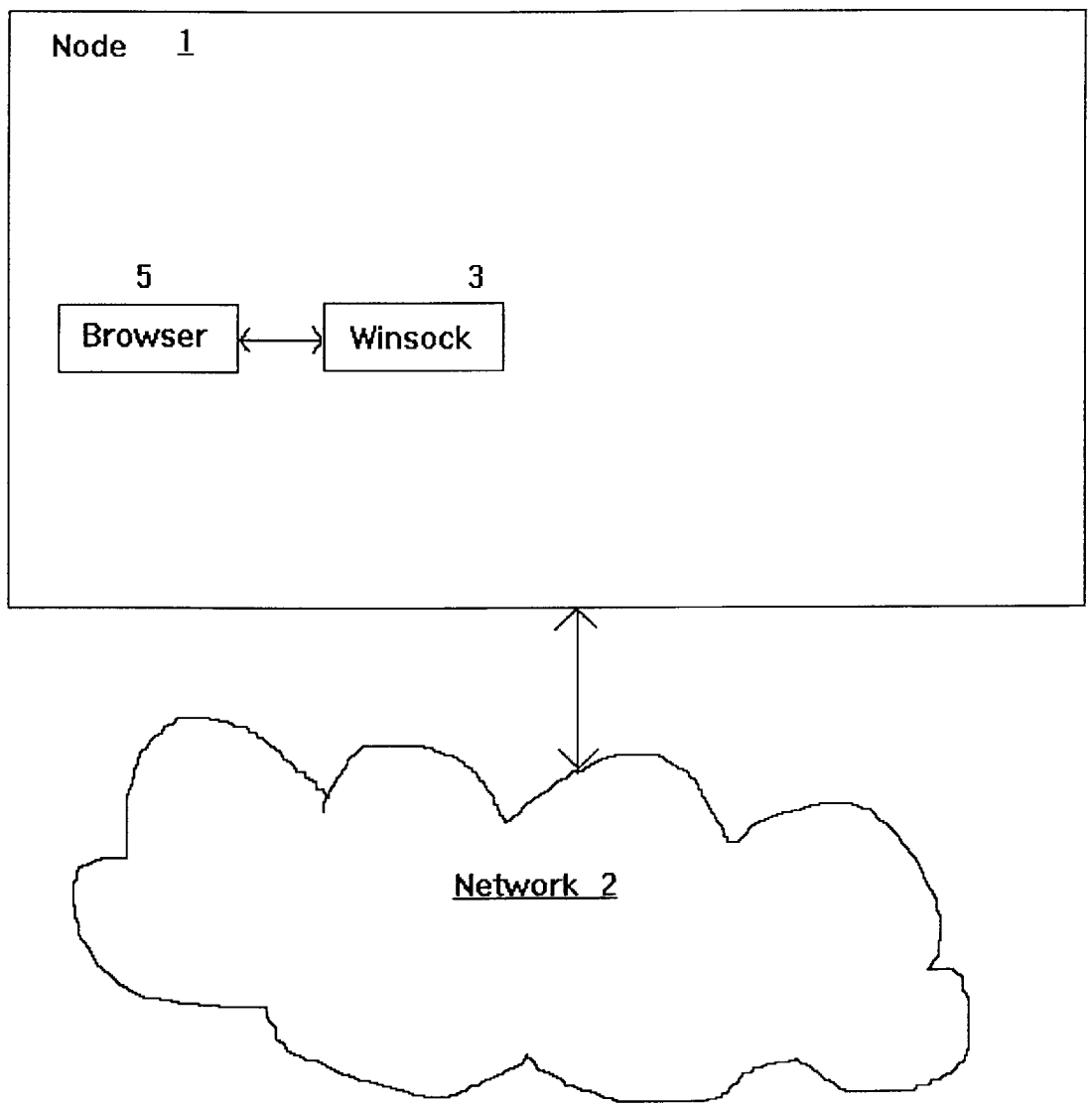
FIG. 1 illustrates a prior art personal computer connection to a network.

FIG. 1 illustrates the prior art. It is well known that a node 1 may be connected to a network 2. The network 2 may be the Internet. The node 1 may be a typical home or office personal computer, or a laptop computer, for example, running the Windows® operating system. The node 1 may also be, for example, any form of computer or computing device, including a set-top box.

For clarity and ease of description, the prior art shown in FIG. 1 and the invention will be described as it may be implemented with node 1 being on a Windows® based computer accessing the Internet network 2 using a dial-up connection. The prior art and the invention however, are not limited to this implementation. It is well known that there are numerous different computers and computing devices that can access many different networks.

Referring again to FIG. 1, a node 1 has a winsock 3 for connecting the node 1 to the network 2. Winsock 3 is well known in the art as the software used to connect the node 1 to the network 2. The term "winsock" is short for windows sockets. Windows sockets are modeled after the Berkely Software Distribution (BSD) "sockets" concept that has been used for many years on UNIX based systems.

Winsock 3 provides an application programming interface (API) for network software such as an Internet browser 5.

The browser 5 is also well known. A browser, for example, Netscape's Navigator or Microsoft's Explorer, is software that under direction from a user, can request and retrieve hyper-text markup language (HTML) from a network server and can create a display based on the HTML it receives. Most browsers can also return information to the network server. Generally, as is well known, a browser 5 places a request to send or retrieve information through the winsock 3, which in turn causes the winsock 3 to transmit the request over a connection to the network 2. Network servers (not shown) and network protocols for locating network servers and communicating with a network server are well known.

Figure 2:
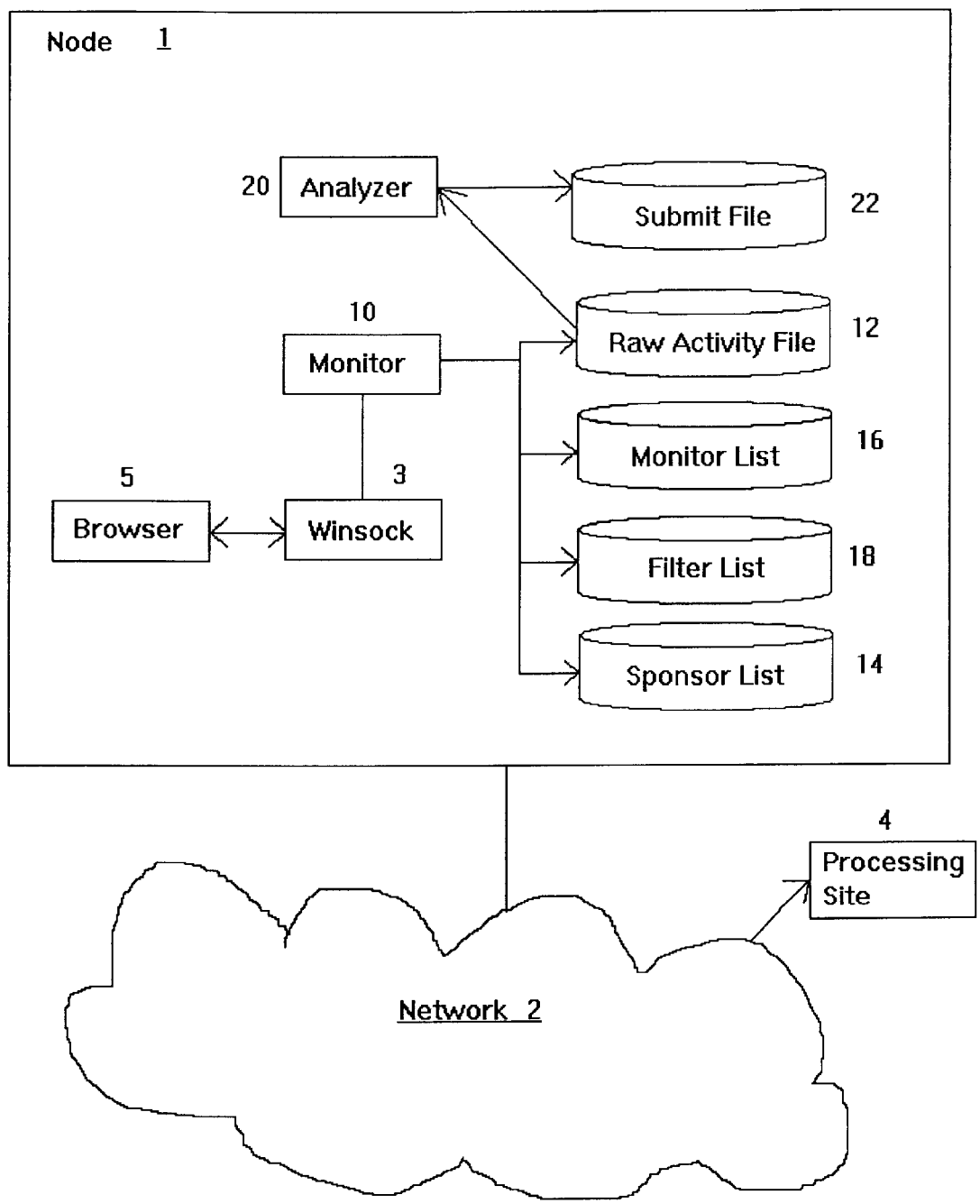
FIG. 2 illustrates an embodiment of the present invention incorporated into a personal computer connected to a network.
Figure 3:
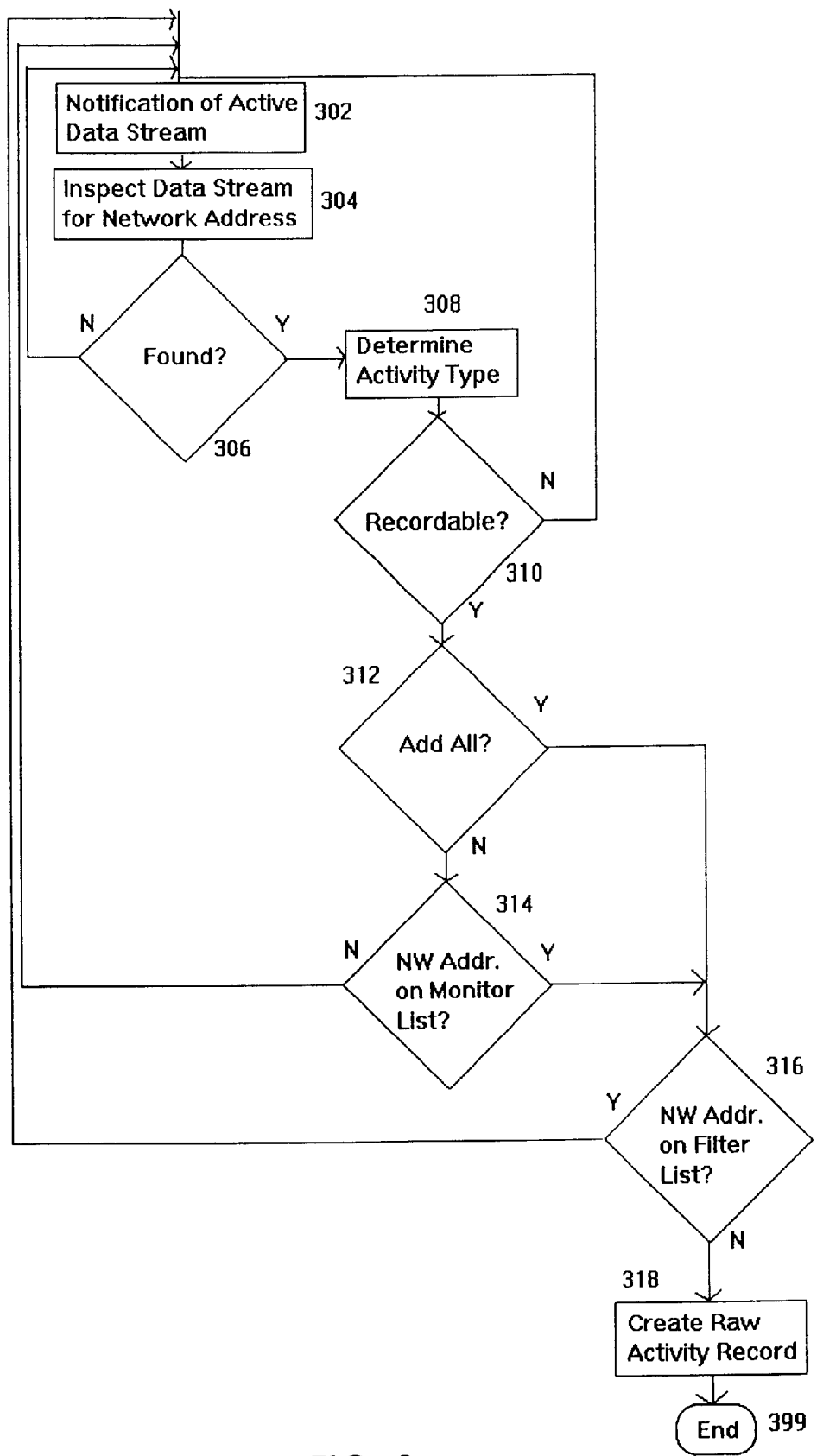
FIG. 3 shows a flow chart of the inventive method of creating an activity record.

Turning now to FIGS. 2 and 3, in the present invention the monitor 10 is operatively linked to a winsock 3 to monitor certain activity. In a preferred embodiment, the monitor 10 is implemented in software, and more particularly as a dynamic linked library (DLL), so that it may load and execute transparently to the user. In another preferred embodiment, the monitor 10 may be executed by an executable program (EXE) that can be loaded by the user in any known fashion. In a preferred embodiment, the winsock 3 notifies the monitor 10 when any activity occurs in the data stream on the connection with the network 2 (step 302). Many of the commercially available winsock 3 programs have the ability to provide such notification after being requested to do so by the monitor 10. If the winsock 3 is unable to generate such notification, any method of detecting and reviewing activity on the network connection may be used. For example, the monitor 10 may "hook" the communications interrupt vector and review the data available at the communications port directly. In a preferred embodiment, if the monitor 10 determines that the winsock 3 lacks the functionality to provide notification of communication activity with the network 2, the monitor 10 will replace the current winsock 3 with a winsock 3 that can provide such notification.

When the monitor 10 is notified that communications activity is occurring in the data stream on the connection with the network 2, the monitor 10 takes a series of steps to determine whether the particular activity constitutes a recordable event. The monitor 10 inspects the data stream at the connection to determine whether there is a network address in the data stream (step 304). If no network address is present, the monitor 10 need not further analyze the data stream.

To determine whether there is a network address present in the data stream, the monitor 10 may analyze the data stream activity looking for certain strings of data. In a preferred embodiment, the monitor 10 scans the first twenty bytes of data looking for characters and strings that are indicative of a hypertext transport protocol Internet address, e.g., a period ("."), a forward-slash ("/"), a colon (":"), or the case-insensitive string "http", and also looking for other binary codes. At decision step 306, if none of the characters or strings are found, or if binary codes that represent data which is not an Internet address are present, the monitor 10 will ignore the data, and return to step 302 to await notification of further activity. If, on the other hand, the monitor 10 finds data indicative of a network address, the monitor 10 then further examines the data stream to determine whether a valid network address is present. In a preferred embodiment, the monitor 10 obtains both the numeric network address and the associated name for the numeric network address. In a preferred embodiment, the monitor 10 searches for network addresses that correspond to World Wide Web site addresses, also called Web site addresses.

If a network address is found, in a preferred embodiment, the monitor 10 next determines the type of activity that is occurring (step 308).

In a preferred embodiment, the monitor 10 determines the type of activity that is taking place by inspecting the data stream. Examples of activities include connecting and disconnecting from a Web site, as well as browsing and downloading information from the site. Preferably the monitor 10 is preprogrammed to identify certain types of activity as recordable activity. A recordable activity is an activity that the monitor 10 will, subject to other limitations, record on the raw activity file 12. For example, the monitor 10 may be programmed to record only the connect and disconnect from a Web site or other network site. In a preferred embodiment, however, the monitor 10 is programmed to record activity, such as, connect, disconnect, browse, accessing areas within a network site, uploading and/or downloading data, ordering products, participation in surveys, and participation in real-time and/or on-line events. In another preferred embodiment, a user may select the activity types that can be recorded.

Accordingly, if the activity identified by the monitor 10 at step 308 is not a recordable activity, at step 310 the monitor 10 will ignore the data, and return to step 302 to await notification of further activity.

In a preferred embodiment, the monitor 10 may be preprogrammed to record recordable activity for all network addresses or only for selected network addresses. When the monitor 10 is preprogrammed to record activity for all network addresses, this is called "add all" mode. Thus, if the activity identified at step 308 is recordable, (step 310) the monitor 10, at step 312, preferably determines whether it is in "add all" mode.

If the monitor 10 is not in "add all" mode, which means that it will record only activity in connection with certain network addresses, then it will determine whether the network address found is one for which activity should be recorded. In a preferred embodiment, there is a monitor list 16 containing a list of network addresses for which activity should be recorded. If, at step 314, the monitor 10 determines that the network address identified at step 304 is not on the monitor list 16, the monitor 10 will ignore the data, and return to step 302 to await notification of further activity.

In another preferred embodiment, the monitor list 16 additionally contains the activities which should be recorded for the listed network addresses. As will be apparent to one of ordinary skill in the art, in such an embodiment, step 310 may then take place after step 314.

In a preferred embodiment, if the monitor 10 is in "add all" mode (see step 312), or, if the network address is on the monitor list 16, the monitor 10 may still prevent recording an activity that occurs in connection with a list of prespecified network addresses stored on a filter list 18. Specifically, the filter list 18 is a list of network addresses for which activity is not to be recorded. Thus, at step 316, if the monitor 10 determines that the network address identified at step 304 is on the filter list 18, the monitor 10 will ignore the data, and return to step 302 to await notification of further activity.

In a preferred embodiment, the user is given complete control over adding and subtracting network addresses from the filter list 18. The filter list 18 protects the user's privacy by allowing a user to identify network addresses where his or her activity is not to be recorded by the monitor 10.

At step 316, if the monitor 10 determines that the network address identified at step 304 is not on the filter list 18, it will create a new activity record in the raw activity file 12. Each new activity record in the raw activity file 12 contains information relating to the activity and the network address identified in connection with the activity. In a preferred embodiment, a new activity record in the raw activity file 12 contains the following information fields:

| NAME | DATA TYPE | DESCRIPTION |
| --- | --- | --- |
| ID | Auto Number | a unique record number |
| UserID | Long Integer | an identifier for the user |
| SiteDotAddress | Character | network address |
| SponsorID | Long Integer | an identifier of a sponsor, if one exists for this network address |
| ActivityDate | TimeStamp | date activity was performed |
| ActivityTime | TimeStamp | time activity was performed |
| ActivityType | Integer | type of activity performed, e.g., connect, browse, disconnect, engage |
| AwardsEarned | Integer | number of awards earned for activity performed |
| AwardState | Byte | the state of the earned award, e.g., earned, allocated, traded, bonus awarded |
| AwardExpiration | TimeStamp | the date the award will expire |
| AwardDisposition | Byte | indicator as to who the award is collected for, e.g., self, charity, group |

Following is a further description of the data fields in a raw activity record of the raw activity file 12.

In a preferred embodiment, the monitor 10 generates the ID, which is a unique identifier for the raw data record.

UserID

UserID is an identifier of the person using the browser 5. In a preferred embodiment, when the monitor 10 is launched, it requests that the user enter the UserID.

SponsorID

In a preferred embodiment, a sponsor list 14 is also present. The sponsor list 14 contains a list of network addresses; each address in the sponsor list 14 corresponds to a sponsor. The sponsor list 14 also contains a SponsorID which is an identifier uniquely identified with a sponsor.

In a preferred embodiment, when the monitor 10 is creating a new activity record on the raw activity file 12, the monitor 10, using appropriate search software, first queries the sponsor list 14 to determine whether the network address corresponding to the activity also corresponds to a sponsor identified on the sponsor list 14. If the address is present on the sponsor list 14, the corresponding SponsorID is placed in the SponsorID field of the raw activity record.

SiteDotAddress

The SiteDotAddress is the numeric network address that was identified by the monitor 10.

ActivityDate and ActivityTime

ActivityDate and ActivityTime are the date and time of the activity to which this raw activity record corresponds. The monitor 10 obtains the date and time corresponding to the activity from the node 1, and inserts this into these fields prior to writing the raw activity record to the raw activity file 12.

ActivityType

This field represents the type of activity that occurred. As described above, after finding the network address, the monitor 10 continues to inspect the data stream to determine the type of activity occurring. The monitor 10 inserts a code representative of the activity type into the ActivityType field prior to writing the raw activity record to the raw activity file 12.

AwardsEarned

In a preferred embodiment, the invention provides an incentive for users to visit and browse sponsored Web sites.

Accordingly, award points may be earned for the various activities that a user does on a Web site, and particularly a sponsored Web site. The number of award points a sponsor provides for the activity type detected is entered into the AwardsEarned field.

Furthermore, in a preferred embodiment, the sponsor list 14 contains the number of award points that will be allocated to users for sponsored activities on sponsored Web sites. Accordingly, the monitor 10 may search the sponsor list 14 to determine the proper entry for this field prior to writing the raw activity record to the raw activity file 12. It will be apparent to one of ordinary skill in the art that the sponsor list 14 can comprise one file, or multiple files. In a preferred embodiment, multiple files are used to enhance performance.

AwardState

The award points can be exchanged for actual awards. In a preferred embodiment, the state of the AwardsEarned awards points is recorded in the AwardState field. For example, such states include, "earned", "allocated" and "traded". A code representative of the state of the award points corresponding to this raw activity record is inserted into the AwardState field. In a preferred embodiment, the monitor 10 will set the AwardState field to "earned" prior to writing a new raw activity record to the raw activity file 12.

AwardExpiration

This field maintains an expiration date for the AwardsEarned points. In a preferred embodiment, if the award points are not redeemed within a certain period, they will expire and have no further value. The monitor 10 will compute and store in this field a date for expiration of the award points. In a preferred embodiment, the AwardExpiration is stored in the sponsor list 14.

AwardDisposition

In a preferred embodiment, this field may be used to indicate a beneficiary of the award points. Thus, for example, the system provides for users to have their award points benefit charity, or alternatively, another group. Other users may choose to keep the awards for themselves.

Once the monitor 10 creates the create a new activity record it may be written to the raw activity file 12 on the node 1. Because the raw activity file 12 remains resident on the user's computer, the file preferably has some form of tamper-proofing or security to prevent the user from modifying the file and adding fraudulent entries representing activities that were not actually undertaken. Any form of security that inhibits tampering with the contents of the raw activity file 12 may be used. For example, an authentication code could be generated for the file each time it is modified. If the authentication code does not correspond to the contents of the file, the file may be discarded as fraudulent. In a preferred embodiment, the file is encrypted using an evolving key algorithm to prevent tampering.

As described above, in a preferred embodiment, as a user browses the Web sites on the Internet, selected activities may be recorded as raw activity records on records in the raw activity file 12. If the monitor 10 is in the "add all" mode, the raw activity file 12 preferably contains all of the recordable activities of the user at all network addresses, except activities at network addresses which the user did not want recorded. If the monitor 10 is not in the "add all" mode, the raw activity file 12 preferably contains all of the recordable activities of the user at only those network addresses contained in the monitor list 16—except activities at network addresses which the user did not want recorded. In one preferred embodiment, the monitor 10 is not in the "add all" mode, and the monitor list 16 is the sponsor list 14—thus, the raw activity file 12 will contain all recordable activities of the user at the sponsor's Web sites—except, of course, activities at network addresses which the user did not want recorded.

Once a raw activity file 12 is created, the data in the file can be read by the analyzer 20. The analyzer 20 is preferably implemented in software, in the form of an program that the user can execute on demand. When invoked, the analyzer 20 may present the user with a listing of the raw activity records that are present on the raw activity file 12. In a preferred embodiment, the analyzer 20 permits the user to review the raw activity records in a number of different ways. For example, the analyzer 20 may permit the user to sort the records by date, or by name of sponsor, or by award points that can be earned. The analyzer 20 also permits the user to select only particular raw activity records for viewing. For example, the analyzer 20 may permit the user to view only raw activity records that have a "connect" ActivityType field. Methods of reviewing, sorting and selecting data are well known, and any such methods can be used.

Using the analyzer 20 the user can select and allocate award points. Specifically, in a preferred embodiment, the user selects one or more raw activity records and instructs the analyzer 20 to allocate the award points associated with those records to, for example, him or herself, or a charity or some other entity. Once the user instructs the analyzer 20 to allocate the award points associated with specific raw activity records, the analyzer 20 updates the records on the raw activity file 12 to indicate in the AwardState field that the award points are allocated. The analyzer 20 writes copies of the raw activity records to the submit file 22 on the node 1. As was discussed above in connection with the raw activity file 12, the submit file must be protected from tampering by the user. As with the raw activity file 12, the submit file 22 is preferably encrypted using an evolving key encryption algorithm.

The submit file 22 is later transmitted via the network 2 to a processing site 4. In one preferred embodiment, the monitor 10 may transmit the submit file 22 to the processing site 4 when it detects a connection to the network 2. Alternatively, the monitor 10 may ask the user for authorization to transmit the submit file 22 at varying times, for example, when the user attempts to disconnect the node 1 from the network 2, or when the user connects the node 1 to the network 2.

After a record of the submit file 22 is delivered to the processing site 4, the AwardState field in the corresponding record in the raw activity file 12 is set to transmitted. In a preferred embodiment, the delivery is confirmed prior to updating the AwardState field. Methods for confirming delivery are well known in the art.

Once the submit file 22 is received by the processing site 4, it is reviewed to determine that it is authentic and has not been tampered with. As discussed above, the submit file 22 is protected from tampering by the user. In a preferred embodiment, the file is decrypted.

After decryption, the processing site 4 reviews the submit file 22 to determine the number of award points earned by the user. In a preferred embodiment, additional award points may be added for activity during incentive periods. For example, downloading a brochure, visiting a site during off-peak hours, or participating in special events like a site debut or a chat may result in additional award points. Once the number of award points is determined, the processing site 4 credits the user with the award points.

In a preferred embodiment, the processing site 4 informs the user of the credit, and provides information to the user regarding how to redeem the credit. Methods of redeeming award credits are well known by one of ordinary skill in the art.

Although the present invention has been described in relation to particular preferred embodiments thereof, many variations and modifications and other uses will become apparent to those skilled in the art. It is preferred, therefore, that the present invention be limited not by the specific disclosure herein, but only by the appended claims.

What is claimed is:

1. A network monitoring and event recording apparatus for monitoring an application layer data stream between a node and a network server and recording data representing an activity occurring in the data stream that is a recordable event, the network monitoring and event recording apparatus comprising:

a stream inspector for non-invasively inspecting a first portion of the application layer data stream to determine whether it contains indicia of an http address;

an address locator for non-invasively inspecting a second portion of the application layer data stream when the first portion of the application layer data stream contains indicia of an http address, the address locator further determining whether an http address is contained within the application layer data stream, wherein the second portion of the application layer data stream includes at least some part of the first portion of the application layer data stream;

an activity type identifier for non-invasively inspecting a portion of the application layer data stream when the second portion of the application layer data stream comprises an http address, the activity type identifier further determining an activity type intended to be achieved by the third portion of the application layer data stream;

a filter list containing a list of pre-specified http addresses and activity types;

a monitor list containing a list of pre-specified http addresses and activity types; and an activity recorder for recording the activity type identified by the activity type identifier and the http address identified by the address locator if the http address and activity type are included in the monitor list but are not included in the filter list.

2. The apparatus claimed in claim 1, wherein the network monitoring and event recording apparatus is implemented within a dynamic link library.

3. The apparatus claimed in claim 1, wherein the network monitoring and event recording apparatus is implemented within a user-executable program.

4. The apparatus claimed in claim 1, wherein the network monitoring and event recording apparatus is implemented as an object in a computing environment.

5. The apparatus claimed in claim 1, wherein the pre-specified monitor list is programmable by a user.

6. The apparatus claimed in claim 1, wherein the pre-specified filter list is programmable by a user.

7. A method of monitoring an application layer data stream between a node and a network server and recording data representing an activity occurring in the data stream that is a recordable event comprising the steps of:

non-invasively inspecting a first portion of the application layer data stream to determine whether it contains indicia of an http address;

non-invasively inspecting a second portion of the application layer data stream when the first portion of the application layer data stream contains indicia of an http address, and determining whether an http address is contained within the application layer data stream, wherein the second portion of the application layer data stream includes at least some part of the first portion of the application layer data stream;

non-invasively inspecting a portion of the application layer data stream when the second portion of the application layer data stream comprises an http address, and determining an activity type intended to be achieved by the third portion of the application layer data stream;

recording the activity type intended to be achieved and the http address if the http address and the activity are included in a monitor list of pre-specified addresses and activity types, but not included in a filter list of pre-specified addresses and activity types.

8. The method claimed in claim 7, wherein at least one of the steps of non-invasively inspecting is implemented within a dynamic link library.

9. The method claimed in claim 7, wherein at least one of the steps of non-invasively inspecting is implemented within a user-executable program.

10. The method claimed in claim 7, wherein at least one of the steps of non-invasively inspecting is implemented as an object in a computing environment.

11. The method claimed in claim 7, wherein the pre-specified monitor list is programmable by a user.

12. The method claimed in claim 7, wherein the pre-specified filter list is programmable by a user.

* * * * *